US011317172B1

(12) United States Patent
Wu et al.

(10) Patent No.: US 11,317,172 B1
(45) Date of Patent: Apr. 26, 2022

(54) VIDEO FRAGMENT AWARE AUDIO PACKAGING SERVICE

(71) Applicant: Amazon Technologies, Inc., Seattle, WA (US)

(72) Inventors: Yongjun Wu, Bellevue, WA (US); Vasanthakumar Soundararajan, Seattle, WA (US); Yang Yang, Issaquah, WA (US); Sitaraman Ganapathy, Issaquah, WA (US); Mukund Manikarnike, Mercer Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/915,945

(22) Filed: Jun. 29, 2020

(51) Int. Cl.
*H04N 21/845* (2011.01)
*H04N 21/43* (2011.01)
*H04N 21/854* (2011.01)

(52) U.S. Cl.
CPC ..... *H04N 21/8456* (2013.01); *H04N 21/4302* (2013.01); *H04N 21/85406* (2013.01)

(58) Field of Classification Search
CPC ........... H04N 21/8456; H04N 21/4302; H04N 21/85406
See application file for complete search history.

(56) References Cited

U.S. PATENT DOCUMENTS

| | | | |
|---|---|---|---|
| 2005/0123042 A1* | 6/2005 | Park | H04N 21/2381 375/240.12 |
| 2013/0054972 A1* | 2/2013 | Thorwirth | H04N 21/8358 713/176 |
| 2014/0013349 A1* | 1/2014 | Millar | H04N 21/44016 725/32 |
| 2017/0366830 A1* | 12/2017 | Czelhan | H04N 21/2335 |
| 2018/0081618 A1* | 3/2018 | McLean | H04N 21/8113 |

OTHER PUBLICATIONS

ATSC, "ATSC Standard: Digital Audio Compression (AC-3, E-AC-3)", Advanced Television Systems Committee, Doc. A/52:2012, Dec. 17, 2012, 270 pages.
Consumer Technology Association, "Web Application Video Ecosystem—Content Specification, CTA-5001-C", Consumer Technology Association, Technology & Standards Department, Dec. 2020, 42 pages.

(Continued)

*Primary Examiner* — Joshua D Taylor
*Assistant Examiner* — Adil Ocak
(74) *Attorney, Agent, or Firm* — Nicholson De Vos Webster & Elliott LLP

(57) ABSTRACT

Techniques for video fragment aware audio packaging that ensure a periodic and best alignment of audio and video fragments at any corresponding audio and video fragments are described. As one example, a video fragment aware audio packaging service determines a number of audio frames for a corresponding video fragment of video frames and generates an audio fragment that includes those audio frames, with flexible choices of video fragment duration, which may be considered and decided for device compatibility or content encoding optimization purposes.

20 Claims, 10 Drawing Sheets

(56) References Cited

OTHER PUBLICATIONS

International Standard ISO/IEC 13818-7, "Information technology—Generic coding of moving pictures and associated audio information, Part 7: Advanced Audio Coding (AAC)", Third edition, Reference No. ISO/IEC 13818-7:2004(E), Oct. 15, 2004, 206 pages.
International Standard ISO/IEC 23009-1, "Information technology—Dynamic adaptive streaming over HTTP (DASH), Part 1: Media presentation description and segment formats", Third edition, Reference No. ISO/IEC 23009-1:2019(E), Aug. 2019, 236 pages.
Microsoft Corporation, "[MS-SSTR]: Smooth Streaming Protocol", V20180912, Sep. 12, 2018, pp. 1-65.
Pantos, R., "HTTP Live Streaming 2nd Edition, draft-pantos-hls-rfc8216bis-05", Informational Internet-Draft Obsoletes: 8216, Sep. 23, 2019, pp. 1-69.
Waddell et al., "Audio/Video Synchronization Standards and Solutions, A Status Report", Advanced Television Systems Committee, 1998, 10 pages.
Wikipedia, "Audio-to-video synchronization", Available Online at <https://en.wikipedia.org/wiki/Audio-to-video_synchronization>, Retrieved on Jan. 6, 2021, pp. 1-5.
Wikipedia, "NTSC", Available Online at <https://en.wikipedia.org/wiki/NTSC>, Retrieved on Jan. 6, 2021, pp. 1-21.

* cited by examiner

VIDEO FRAGMENT AWARE AUDIO PACKAGING SERVICE

BACKGROUND

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as "data centers," may include a number of interconnected computing systems to provide computing resources to users of the data center. The data centers may be private data centers operated on behalf of an organization or public data centers operated on behalf, or for the benefit of, the general public. Service providers or content creators (such as businesses, artists, media distribution services, etc.) can employ one or more data centers to deliver content (such as web sites, web content, or other digital data) to users or clients.

BRIEF DESCRIPTION OF DRAWINGS

Various embodiments in accordance with the present disclosure will be described with reference to the drawings, in which.

DETAILED DESCRIPTION

Figure 1:
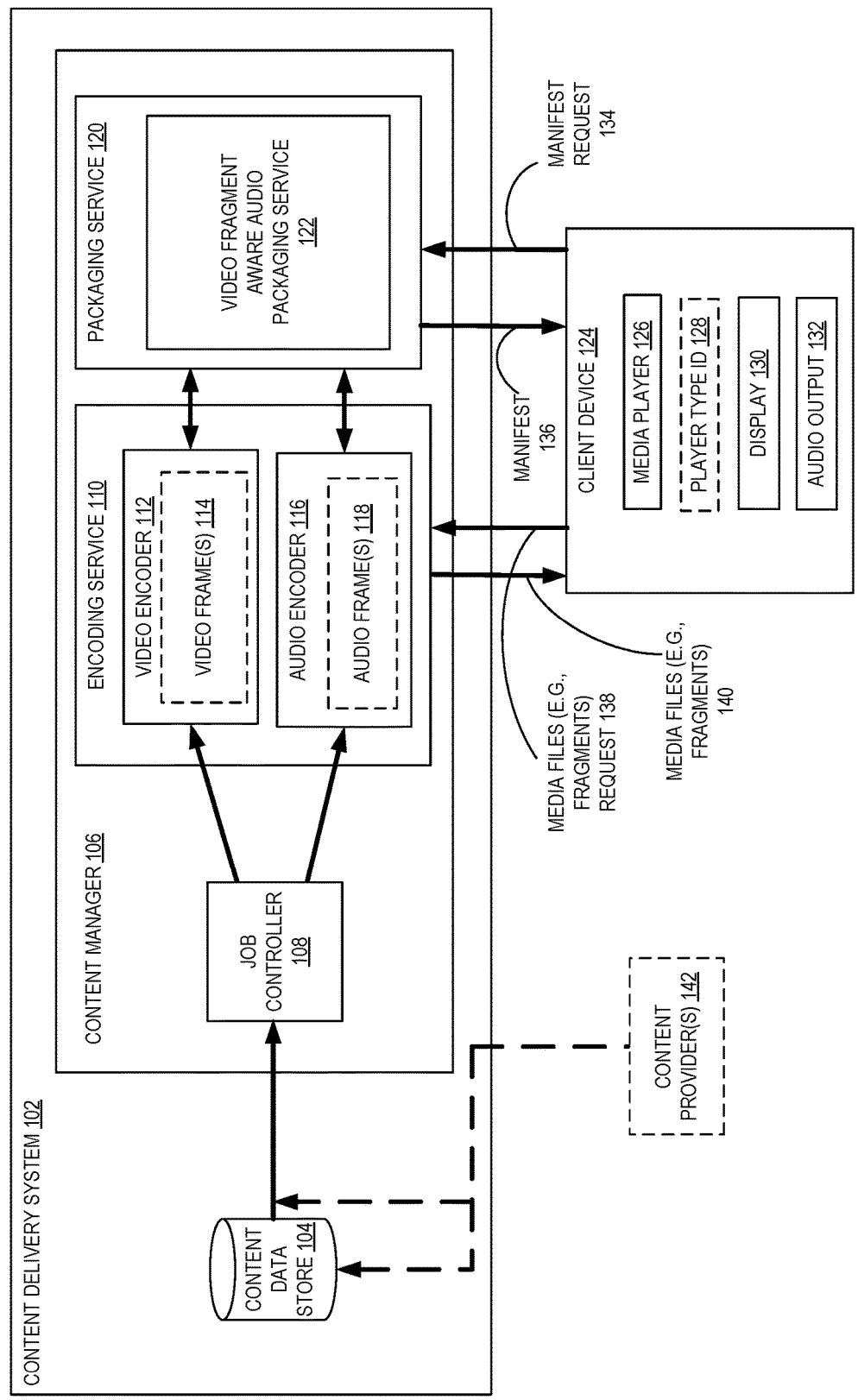
FIG. 1 is a diagram illustrating an environment including a content delivery system having a packaging service according to some embodiments.

Various embodiments of methods, apparatuses, systems, and non-transitory computer-readable storage media for video fragment aware audio packaging are described.

According to some embodiments, a video fragment aware audio packaging service determines a number of audio frames for a corresponding video fragment of video frames and generates an audio fragment that includes those audio frames. In embodiments, video fragment aware audio packaging ensures a periodic and best alignment of audio and video fragments, e.g., even for non-integer frame rates and variable fragment durations. In embodiments, video fragment aware audio packaging ensures that (e.g., human perceived) audio/visual (A/V) synchronization is maintained irrespective of where other (e.g., secondary) content is inserted.

Streaming technologies may deliver one or more of a set of multimedia (e.g., video and audio) representations to a (e.g., client) device. These representations form the encoded package that is finally delivered to the device in certain embodiments. In one embodiment, a manifest (e.g., manifest file) identifies the set of available multimedia representations for the device. In one embodiment, the manifest is a Media Presentation Description (MPD) document. In one embodiment, the manifest identifies the Uniform Resource Locator (URL) or URLs to access the file(s) for the multimedia representations. The manifest may be an adaptive bitrate (ABR) streaming manifest, such as a manifest according to a MPEG-DASH standard, a HyperText Transfer Protocol (HTTP) Live Streaming (HLS) standard, a Smooth Streaming standard, or any other streaming protocols. Use of a manifest allows a client device to retain primary control over the streaming of the media in certain embodiments.

In one embodiment, a content delivery system provides a plurality of different multimedia representations for possible bitrates and/or resolutions of the same multimedia file (e.g., a single multimedia title), for example, to deliver high (e.g., the highest) multimedia quality to a device of a plurality of devices with a varying set of capabilities and/or varying client bandwidth capacity, e.g., and adjusts the quality of the multimedia stream between multiple bitrates and/or resolutions. The multimedia stream may include main content (e.g., a motion picture with corresponding sound) and secondary content (e.g., advertising content with or without sound), e.g., secondary content that is inserted in the main content by content stitching, advertising insertion, or other content insertion.

A content delivery system (e.g., the encoding and packaging services/pipelines thereof) may have a split design for secondary content (e.g., advertisement) stitching, e.g., depending on the nature of the secondary content that is to be inserted into the main content. For secondary content that is to be inserted mid-roll (e.g., mid-movie) into the main content, one or more of the following constraints may be utilized. First, the non-integer source frame rates (e.g., 23.976 or 29.97 frames per second (fps)) may be converted (e.g., rounded) to the nearest integer frame rate (e.g., 24 fps and 30 fps, respectively for 23.976 fps and 29.97 fps) during encoding (e.g., transcoding). Second, the video fragment duration (e.g., for a video according to a MPEG-DASH standard) may be restricted to a single, fixed duration (e.g., integer duration), for example, exactly 2 seconds of duration for a fragment. However, it may be desirable not to use one or both of these constraints. Next, is a discussion of certain terminology, followed by two example cases that illustrate a technical problem of (e.g., human perceptible) misalignment of video and audio fragments, e.g., where the audio stream is either shorter or longer than the video stream, that is solved by the video fragment aware audio packaging service disclosed herein.

Example non-integer frame rates according to a National Television Standards Committee video standard is: 24,000/1,001=23.97 fps, 30,000/1001=29.97 fps, and 60,000/1,001=59.94 fps. Example integer frame rates from a Phase Alternating Line (PAL) standard or digital video system is: 24 fps, 25 fps, 30 fps, 50 fps and 60 fps. Some example video-on-demand frame rates are 23.97 fps, 24 fps, 25 fps, 29.97 fps, and 30 fps. Some example live streaming integer frame rates are 24 fps, 25 fps, 30 fps, 50 fps, and 60 fps.

In certain embodiments, the video frame duration it is the time duration of one video frame divided by the video frame rate. For example, at 23.97 fps, that is 1,001/24,000=41.71 ms.

In certain embodiments, the audio sampling frequency (e.g., of an audio compression schemes or standard) defines how many audio points are sampled from a (e.g., analog or digital) signal in a certain time period (e.g., one second). In one embodiment, the output compressed audio stream uses 48 kHz sampling. In one embodiment, the output compressed audio stream uses 24 kHz sampling. In another embodiment, (e.g., in high-efficiency advanced audio coding (HE-AAC) standard (e.g., v1 and v2)) the output compressed audio stream uses 32 kHz sampling, for example, for an advanced audio compression standard (e.g., AAC-low complexity (LC) standard). Thus, various audio sampling frequencies may be utilized.

In one embodiment, an (e.g., AAC-LC) audio frame has 1,024 audio point samples for transformation from time domain to frequency domain, and hence the duration of each of these audio frames is 1,024/48,000=21.33 ms. In one embodiment, an (e.g., HE-AAC) audio frame has 1,024 audio point samples, but the sampling frequency is halved, (e.g., 24 KHz) (for example, as compared to AAC-LC, because of the feature of Spectral Band Replication (SBR) used in HE-AAC v1 and v2), and hence the duration of each of these audio frames is 1,024/24,000=42.67 ms. In one embodiment, an audio frame has 1,536 audio point samples (e.g., in a Dolby Digital Plus specification) (e.g., instead of 1,024) and hence the duration of each of these audio frames is 1,536/48,000=32 ms.

In certain embodiments, A/V becoming unsynchronized comes from both the initial misalignment in the main content, which impacts the A/V synchronization in inserted contents, and the accumulated drifting from the secondary content, which impacts the A/V synchronization in main content and subsequent inserted contents.

In certain embodiments, the detectability threshold (e.g., less than an undetectability plateau/threshold) between the synchronization of audio and video is a lagging threshold (e.g., about −125 ms) and/or a leading threshold (e.g., about +45 ms). That is, in these embodiments, audio should not be earlier than video by the leading threshold (e.g., +45 ms) and not be later than video by the lagging threshold (e.g., about 125 ms) in order to not have perceivable audio and video out-of-sync. In some embodiments, an acceptability threshold (e.g., lower than the detectability threshold(d)) may be utilized, for example, a larger lagging threshold (e.g., about −185 ms) and/or a larger leading threshold (e.g., about +100 ms). Certain embodiments herein utilize one of more of these thresholds for video fragment aware audio packaging. In certain embodiments, video fragment aware audio packaging ensures that the presented (e.g., to a user) audio lags the presented video (e.g., to a user), where audio late (e.g., 125 ms>45 ms and 185 ms>100 ms) is preferred over audio early.

Example 1: 30 Fps of Video Frame Rate and Audio Frames Partitioned According to Advanced Audio Coding-Low Complexity (AAC-LC) Standard at 48 Kilohertz (kHz)

$$X_1 \times \frac{1}{30} = Y_1 \times \frac{1024}{48000} \quad (1)$$

$$\frac{X_1}{Y_1} = \frac{16}{25} \quad (2)$$

Thus, (1) and (2) indicate every 16 video frames and every 25 AAC-LC audio frames can have the same duration of 16/30=(25×1024)/48000=0.53 second. In one embodiment, packaging can align audio and video at Nx0.53 seconds (where N is any positive integer). However, in certain embodiments, that requires setting instantaneous decoding refresh (IDR) interval and video fragment duration to be an integer multiplication of 16 frames, and setting one audio fragment to contain the number of AAC-LC audio frames in the integer multiplication of 25. In one embodiment, an IDR picture is a coded picture where all slices are I slices (e.g., frames that do not require other frames to decode) or switching I (SI) slices (e.g., according to a H.264 video coding standard) that cause the decoding process to mark all reference pictures as "unused for reference" immediately after decoding the IDR picture. After the decoding of an IDR picture, in certain embodiments, all following coded pictures in decoding order can be decoded without inter prediction from any picture decoded prior to the IDR picture (e.g., where the first picture of each coded video sequence is an IDR picture).

In certain embodiments, the video fragment duration is a constant of exactly 2 seconds.

$$F_1 \times 2 = Y_1' \times \frac{1024}{48000} \quad (3)$$

$$\frac{F_1}{Y_1'} = \frac{4}{375} \quad (4)$$

Thus, (3) and (4) indicate that every 4 video fragments and every 375 audio frames can have the same duration of (375×1024)/48000=8 seconds. That is, in certain embodiments, 8 seconds consists of 4 audio fragments of audio frames (e.g., a first audio fragment of 94 frames, a second audio fragment of 94 frames 94, a third audio fragment of 94 frames, and a fourth audio fragment of 93 frames, e.g., having a respective duration of 2.0053, 2.0053, 2.0053, and 1.984 seconds), and 4 video fragments each having a respective duration of 2 seconds. The maximum misalignment between audio and video streams in this example is 16 ms longer in audio stream than video stream, which will have 16 ms delay/late in the audio stream of inserted contents, far below the threshold of 125 ms. The maximum drifting coming from the maximum misalignment of one piece of inserted content is also 16 ms. When the accumulated drifting from multiple pieces of inserted contents is larger than a threshold T (e.g., T=about 34 ms), a packaging system may compensate the drift by dropping one audio frame on purpose and pulling back the drifting by one audio frame duration (e.g., one audio frame of 21.33 ms duration, such that 34−21.33=12.67 ms), with a 8-second inserted content and the last audio frame dropped in the last audio fragment.

Example 2: 29.97 Fps of Video Frame Rate (30,000/1,001) and Audio Frames Partitioned According to AAC-LC Standard at 48 kHz $$X_2 \times \frac{1001}{30000} = Y_2 \times \frac{1024}{48000} \qquad (5)$$

$$\frac{X_2}{Y_2} = \frac{640}{1001} = \frac{1920}{3003} \qquad (6)$$

Thus, (5) and (6) indicate that every 1920 video frames and every 3003 audio frames can have the same duration of (1920×1001)/30000=(3003×1024)/48000=64.064 seconds. In certain embodiments, 64.064 seconds of same duration is 32 2.002-second video fragments, and 5 1.984-second, and 27 2.0053-second audio fragments per (7) below.

$$27 \times \frac{1024}{48000} \times 94 + 5 \times \frac{1024}{48000} \times 93 = 64.064 \qquad (7)$$

However, in certain embodiments, a player may not support that video fragment duration (e.g., it may be limited to a constant video fragment duration, such as, but not limited to, 2.002 seconds).

$$F_2 \times 2.002 = Y'_2 \times \frac{1024}{48000} \qquad (8)$$

$$\frac{F_2}{Y'_2} = \frac{32}{3003} \qquad (9)$$

Thus, (8) and (9) illustrate that in this example, audio and video streams can be aligned every 32 2.002-second video fragments and every 5 1.984-second and 27 2.0053-second audio fragments. In certain embodiments, a player supports only one (or a proper subset of less than all) audio fragment durations (e.g., it may only support 1.984-second and/or 2.0053-second audio fragment durations).

For example, a fixed pattern of audio fragments (e.g., 94, 94, 94, 93 frames, respectively) may be utilized. An example of this is the below pattern:
Audio:
[94, 94, 94, 94, 94, 94, 93, 94, 94, 94, 94, 94, 93, 94, 94, 94, 94, 94, 94, 93, 94, 94, 94, 94, 94, 93, 94, 94, 94, 94, 94, 93]
where each of these 32 audio fragments either contains 94 or 93 audio frames, i.e. 2.0053 seconds or 1.984 seconds in duration, respectively.
Video:
[N, N, N, N, N, N, N, N, N, N, N, N, N, N, N, N, N, N, N, N, N, N, N, N, N, N, N, N, N, N, N, N]
where each of these 32 video fragments (N) has a duration equal to 2.002 seconds.
Then the misalignment in main content or one piece of inserted content will be,
[D, 2D, 3D, 4D, 5D, 6D, P,
P+D, P+2D, P+3D, P+4D, P+5D, 5D−8P, 2P,
2P+D, 2P+2D, 2P+3D, 2P+4D, 2P+5D, 5D−7P, 3P,
3P+D, 3P+2D, 3P+3D, 3P+4D, 4D−6P, 5D−6P, 4P,
4P+D, 4P+2D, 4P+3D, 0]

where D=2.0053−2.002=3.33 ms, and P=2 ms. Specifically,
6D=20 ms
2P+5D=20.6 ms
3P+4D=19.33 ms
4P+3D=18 ms,
That is, the maximum misalignment is controlled to be less than one audio frame duration of 21.33 ms.

Certain embodiments herein support a constant video fragment duration (e.g., selected only as 2.002 seconds or 2.000 seconds) and an audio fragment duration selected from a proper subset of less than all audio frames (e.g., only choosing from two possible durations, e.g., 94 or 93 audio frames of duration (2.005333 seconds or 1.984 seconds in AAC-LC, and 2.016 seconds or 1.984 seconds in other standards). Certain embodiments herein utilize a (e.g., single) constant video fragment duration (e.g., of 2.002 seconds) at a non-integer frame rate, and the existing audio fragment duration of 2.005333 seconds or 1.984 seconds in AAC-LC. This may minimize or eliminate the risks for device compatibilities on audio and video fragment durations in certain embodiments.

Certain embodiments herein allow for the insertion of secondary content, e.g., where the fragment request is time based and advertising token generation and decoding require precise time duration of each audio fragment (e.g., up to 100 nanoseconds (ns)). In certain embodiments, a fixed pattern can allow the independent packaging of audio and video fragments in parallel, since audio fragment packaging does not need any information from each video fragment packaging, besides the overall information of integer or non-integer video frame rate.

In certain embodiments, the same fixed pattern of audio fragment duration will apply to both main content and secondary content. In one embodiment, two copies of audio fragments are kept for the secondary content: the original one and another one with the last audio frame dropped in the last audio fragment. In one embodiment, content encode generates the drifting metadata for each secondary content (e.g., advertisement of a block of multiple advertisements) together, e.g., and generating a different version of ad token with drifting control and designed thresholds towards audio stream coming late.

However, for main content that was not enabled with mid-roll secondary content insertion, rather only pre-roll, certain embodiments encode the main content at its original frame rates without frame rate conversion, (e.g., 23.976, 24, 25, 29.97, or 30 fps with the variable video fragment duration in a time range (e.g., between 2.5 and 5.005 seconds) or in one of two video durations (e.g., 2 second or 2.002 second video fragment duration). Certain media players have a fixed fragment structure, e.g., due to limitations on devices where players cannot be updated. Thus, if audio packaging has a fixed pattern of audio fragments (e.g., four 94, 94, 94, 93 frame fragments) in every 4 audio fragments, it will introduce a misalignment of audio stream earlier than the video stream by 80 ms (e.g., when there is 80 seconds of pre-roll with video in the duration of 80.080 seconds but audio in the duration of 80 seconds and, with a limitation of up to 60 seconds of pre-roll, with a misalignment of the audio stream being earlier by 56 ms).

Certain embodiments utilize playlisting and cue-point aware encoding, and thus, embodiments of video fragment aware audio packaging make the encoding, packaging, ad token, and stitching more generic and robust by absorbing the complexities that non-integer frame rate and variable fragment duration cause. Certain embodiments herein allow a packing service to avoid target frame rate conversions, losing video quality and artist intents, and/or using constant video fragment duration. Certain embodiments herein allow a packing service to perform a periodic and best alignment of audio and video fragments. Certain embodiments herein allow the use of drop/non-drop audio frames and advertisement metadata (e.g., content type, time stamp(s), identifiers, etc.) generated from content encode, e.g., for non-integer frame rates and variable fragment duration in DASH, HLS, or other streaming technologies.

Certain embodiments herein support both integer and non-integer video frame rates, and thus have the freedom to employ variable fragment durations (e.g., in the range of about 2.5 to about 5.005 seconds) for main content encoding. Certain embodiments herein utilize a single video frame rate and/or single audio frame rate for a single multimedia file (e.g., the video file and/or audio file thereof). Certain embodiments herein utilize a fixed video fragment duration (e.g., of 2.002 seconds) (e.g., a non-integer frame rate) for main content, for example, with mid-roll, pre-roll and post-roll all enabled.

Certain embodiments herein (e.g., having a variable video fragment duration) package audio so that A/V sync is manageable irrespective of insertion of other content. An example of this is discussed below in reference to FIG. 4.

Turning now to the figures, FIG. 1 is a diagram illustrating an environment 100 including a content delivery system 102 having a packaging service 120 according to some embodiments. The depicted content delivery system 102 includes a content data store 104, which may be implemented in one or more data centers. As one example, a media file (e.g., including a video file and audio file) (e.g., a media container) that is to be encoded is accessed from the content data store 104 by content manager 106. The media file may be uploaded to content data store 104 by content provider(s) 142 or provided directly (e.g., as live content) to content manager 106 by content provider(s) 142.

In one embodiment, the content manager 106 includes a job controller 108 to control each encoding job. In certain embodiments, job controller 108 controls the encoding (e.g., transcoding) of a media file into packages and files in various formats and in different sizes for distribution to end users (e.g., viewers). In certain embodiments, a user (e.g., separate from an end user) creates a job for a (e.g., uncompressed) multimedia file from content data store 104 by specify (e.g., via a console of or an application programming interface (API) call to the content manager) the information that the service will use to perform the encoding (e.g., transcoding) which may include, which multimedia file(s) to encode (e.g., transcode), which types of files to create and where to store them, which encoding settings to use, which advanced features to apply, etc. In certain embodiments, to set up a job in job controller 108, a user specifies the input files (e.g., from content data store 104) for the service to encode (e.g., transcode from one format to a different format), for example, by specifying the source for each video, audio, and captions media element. That source might be a specific part of a primary input file, or it might be a separate file. In certain embodiments, to set up a job in job controller 108, a user specifies the types of output files (e.g., and packages) that are to be generated from the input. In certain embodiments, to set up a job in job controller 108, a user specifies the encoding settings to produce the quality and type of output that is desired.

In one embodiment, the encoding service 110 is to encode the media file (e.g., video file and corresponding audio file) into a plurality of video and audio representations (e.g., streams). In FIG. 1, video encoder 112 is to receive an input of a video file and create video frame(s) 114 from that video file, e.g., for a video frame and/or fragment duration. In FIG. 1, audio encoder 116 is to receive an input of an audio file and create audio frame(s) 118 (e.g., a number of audio samples within each frame) for that audio file, e.g., at an audio frame and/or fragment duration. In certain embodiments, packaging service 120 is then to create one or more sets of multimedia (e.g., video and audio) representations (e.g., a media presentation), for example, a representation according to a standard (e.g., a MPEG-DASH standard, a HyperText Transfer Protocol (HTTP) Live Streaming (HLS) standard, or a Smooth Streaming standard). Encoding service 110 may include a plurality of instances of video encoder 112 and audio encoder 116, e.g., to process multiple inputs in parallel.

It may be generally unrealistic to encode the media file into an almost boundless number of video and audio representations. Instead, embodiments herein generate a manifest of the available representations (e.g., stored in content delivery system 102) and form a superset manifest. The packaging service 120 then uses the superset manifest to generate a manifest identifying a proper subset of video and audio representations for a particular client device 124 (e.g., based on the client's media player 126 (e.g., determined from its type ID value 128), display 130 resolution, audio output 132 capabilities, and/or available bandwidth). In certain embodiments, the content is stored in the content delivery system 102 in two parts: (i) the manifest of all available media representations (e.g., their URL addresses and, optionally, other characteristics, and (ii) the media representations (e.g., stream of fragments) in a single (e.g., container) or multiple files. In one embodiment, a client device is to read (or store) a manifest 136 (e.g., sent in response to manifest request 134) before the client device may make a request 138 for the media from that manifest, and thus access media files 140 (e.g., audio fragments and corresponding video fragments).

In certain embodiments, packaging service 120 includes a video fragment aware audio packaging service 122, e.g., in addition to a video packaging service. Video packaging of packaging service 120 may thus partition a video file into a plurality of video fragments (e.g., each comprising a plurality of video frames 114). In embodiments, video fragment aware audio packaging service 122 takes as its input the audio frame(s) 118 and information that indicates the video fragments (e.g., the start and/or end boundaries of the video fragments) and generates audio fragments based on those inputs. As one example, video fragment aware audio packaging service 122 determines a number of audio frames for a corresponding video fragment of video frames and generates an audio fragment that includes those audio frames. In embodiments, video fragment aware audio packaging service 122 ensures a periodic and best alignment of audio and video fragments, e.g., even for non-integer frame rates and variable fragment durations.

Figure 2:
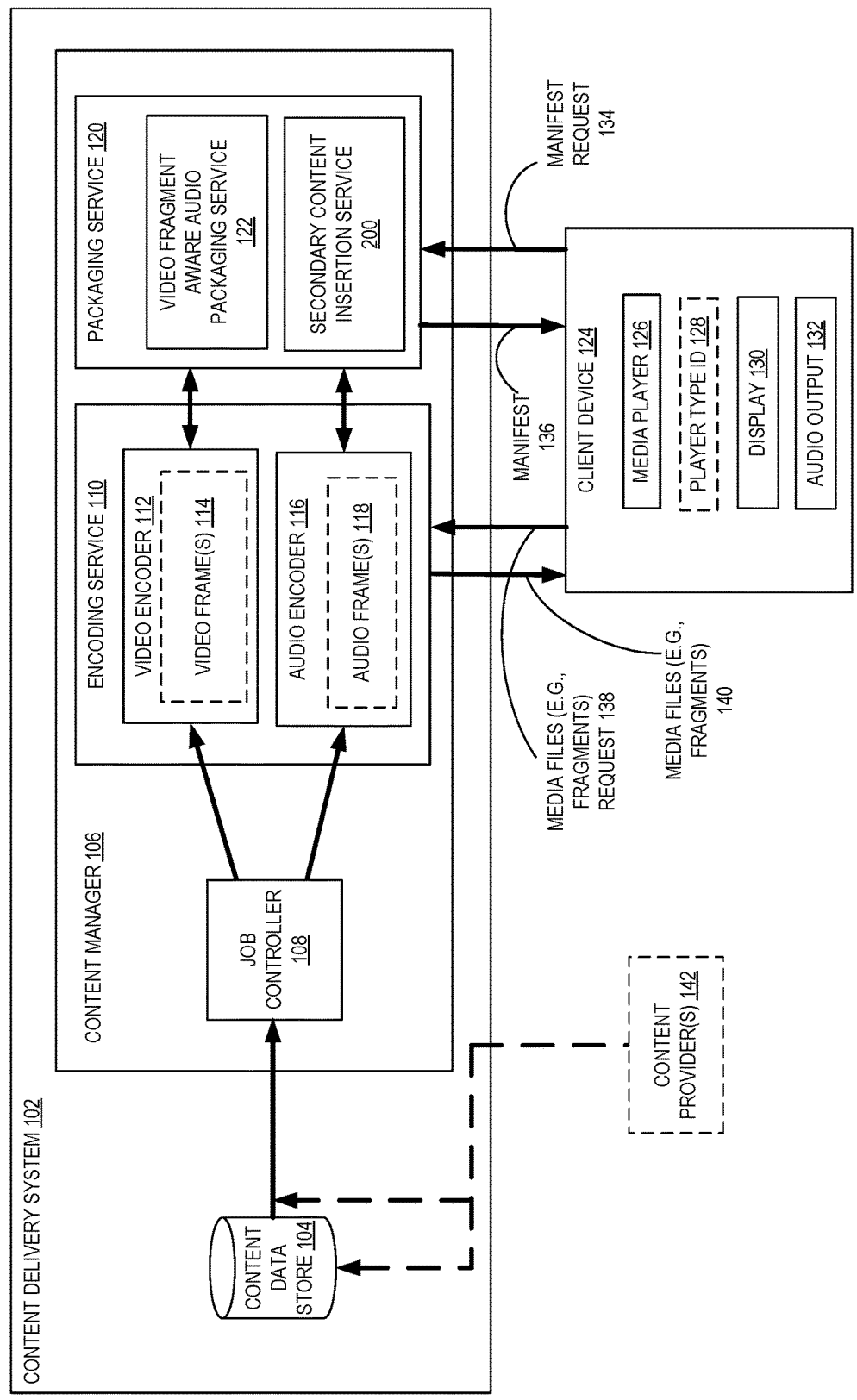
FIG. 2 is a diagram illustrating an environment including a content delivery system having a packaging service that includes a secondary content insertion service according to some embodiments.

FIG. 2 is a diagram illustrating an environment 100 including a content delivery system 102 having a packaging service 120 that includes a secondary content insertion service 200 according to some embodiments. In certain embodiments, secondary content insertion service 200 adds secondary content (e.g., advertisement(s)) into a main content. In one embodiment, encoding service is to encode both the main content and secondary content, e.g., and the secondary content insertion service 200 is to insert the secondary content into the main content. In one embodiment, a video fragment aware audio packaging service 122 is performed on the audio file of primary content and second content, e.g., separately.

Figure 3:
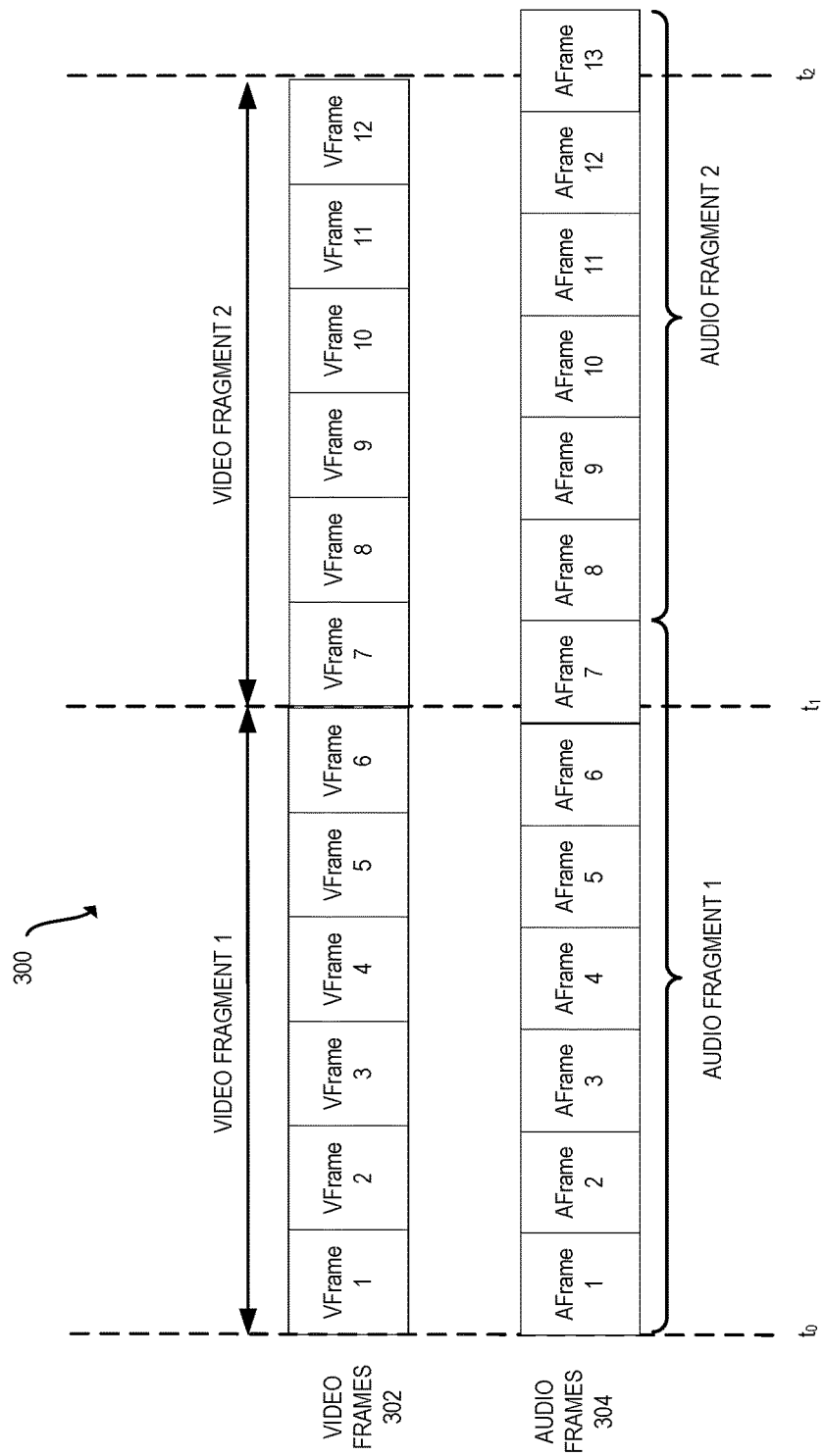
FIG. 3 is a timeline illustrating video fragment aware audio packaging according to some embodiments.

FIG. 3 is a timeline 300 illustrating video fragment aware audio packaging according to some embodiments. In the depicted embodiment, a video encoder (e.g., video encoder 112) generates a stream of video frames 302 for a video file and an audio encoder (e.g., audio encoder 116) generates a stream of audio frames 304 for a audio file corresponding to the video file. Although 12 video frames (VFrames) indexed 1 to 12 are depicted in FIG. 3, any number of video frames may be generated for a video file. Although 13 audio frames (AFrames) indexed 1 to 13 are depicted in FIG. 3, any number of audio frames may be generated for an audio file.

In certain embodiments, video frames 302 are input into a packaging service (e.g., packaging service 120) and a plurality of video fragments are generated, e.g., based on an instantaneous starting point (e.g., instantaneous decoding refresh (IDR) interval) and/or a desired video fragment duration. In the depicted embodiment, video fragment 1 includes video frames 1-6 and video fragment 2 includes video frames 7-12, with the video fragment boundaries at times to (start boundary of video fragment 1), $t_1$ (start boundary of video fragment 1 and end boundary of video fragment 2), and $t_2$ illustrated by dotted lines. In one embodiment, the duration of a (e.g., each) video frame is different that the duration of (e.g., each) audio frame. In one embodiment, the duration of a (e.g., each) video frame is the same as the duration of (e.g., each) audio frame. Each video and audio frame may include a time stamp, e.g., indicating the time (e.g., start and/or end time) in the media file (e.g., time elapsed in the playback duration).

In certain embodiments, audio frames 304 are input into a packaging service (e.g., video fragment aware audio packaging service 122) along with certain information about the video fragment(s) as discussed herein. In certain embodiments, video fragment aware audio packaging determines that video fragment 1 includes video frames 1-6, and particularly, that video frame 6 includes a (e.g., end) time stamp (e.g., ti), and includes within audio fragment 1 the audio frames 1-7, to thus include an audio frame 7 that lies on (for example, and extends past as the audio and video fragment boundaries do not align, e.g., at $t_1$ and/or $t_2$) the end boundary of video fragment 1. In one embodiment, this is achieved by utilizing the (e.g., start and/or end) time stamps for each frame and/or fragment.

Insert content may thus stop the playback (e.g., at a video fragment boundary) of the primary content illustrated in FIG. 3, insert and play secondary content, and then continue playback of the primary content without the audio and video becoming (e.g., human perceived) unsynchronized.

In certain embodiments, video fragment aware audio packaging is to determine that video fragment 2 includes video frames 7-12, and particularly, that video frame 12 includes a (e.g., end) time stamp (e.g., $t_2$), and include within audio fragment 2 the audio frames 8-13 (e.g., starting with audio frame 8 as audio frame 7 was already included in audio fragment 1), to thus include an audio frame 13 that lies on (e.g., and extends past) the end boundary of video fragment 2. In one embodiment, this is achieved by utilizing the time stamps for each frame.

Figure 4:
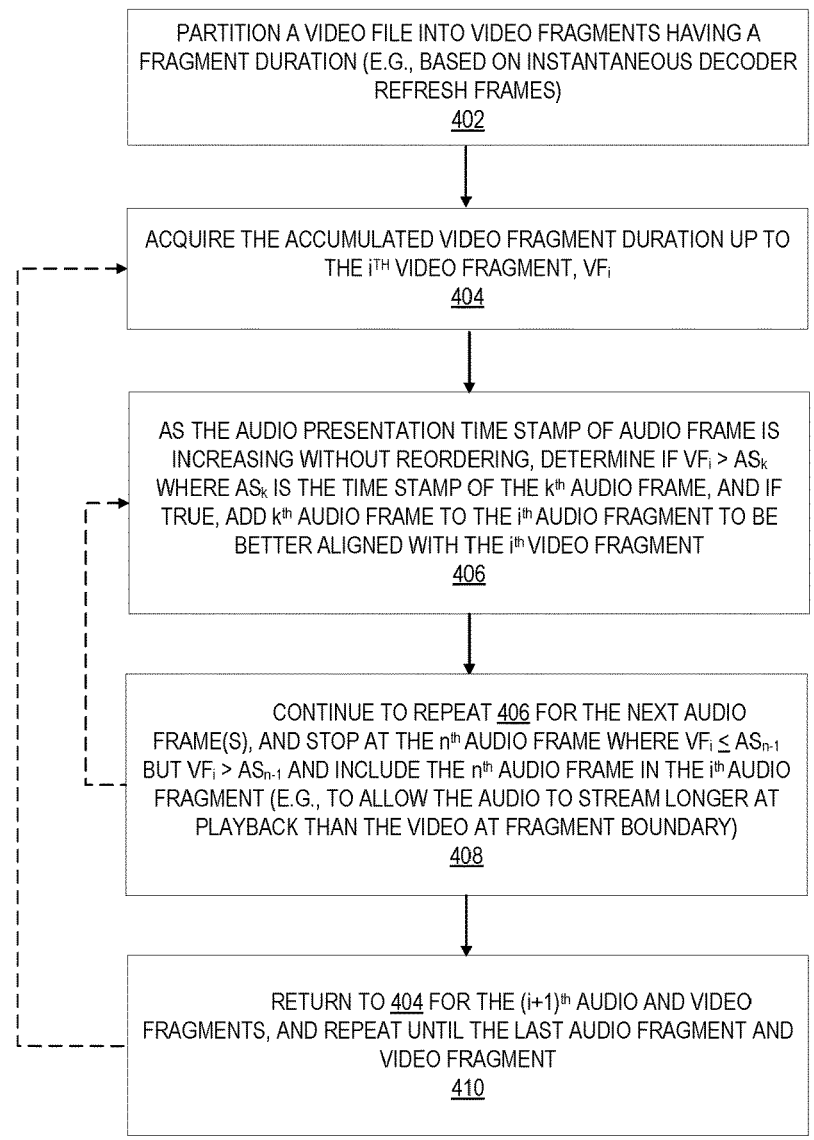
FIG. 4 is a flow diagram illustrating operations of a method for video fragment aware audio packaging according to some embodiments.

FIG. 4 is a flow diagram illustrating operations 400 of a method for video fragment aware audio packaging according to some embodiments. Some or all of the operations 400 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 400 are performed by content delivery system 102 (e.g., implemented in a provider network) of the other figures.

The operations 400 include, at block 402, partitioning a video file into video fragments having a fragment duration (e.g., based on instantaneous decoder refresh frames). The operations 400 further include, at block 404, acquiring the accumulated video fragment duration up to the $i^{th}$ video fragment ($VF_i$). The operations 400 further include, at block 406, as the audio presentation time stamp of audio frame is increasing without reordering, determine if $VF_i > AS_k$ where $AS_k$ is the time stamp of the $k^{th}$ audio frame, and if true, add $k^{th}$ audio frame to the $i^{th}$ audio fragment to be better aligned with the $i^{th}$ video fragment. The operations 400 further include, at block 408, continue to repeat block 406 for the next audio frame(s), and stop at the $n^{th}$ audio frame where $VF_i \leq AS_{n-1}$ but $VF_i > AS_{n-1}$ and include the $n^{th}$ audio frame in the $i^{th}$ audio fragment (e.g., to allow the audio to stream longer at playback than the video at fragment boundary). The operations 400 further include, at block 410, return to block 404 for the $(i+1)^{th}$ audio and video fragments, and repeat until the last audio fragment and video fragment (e.g., of the single multimedia file being processed by operations 400).

Figure 5:
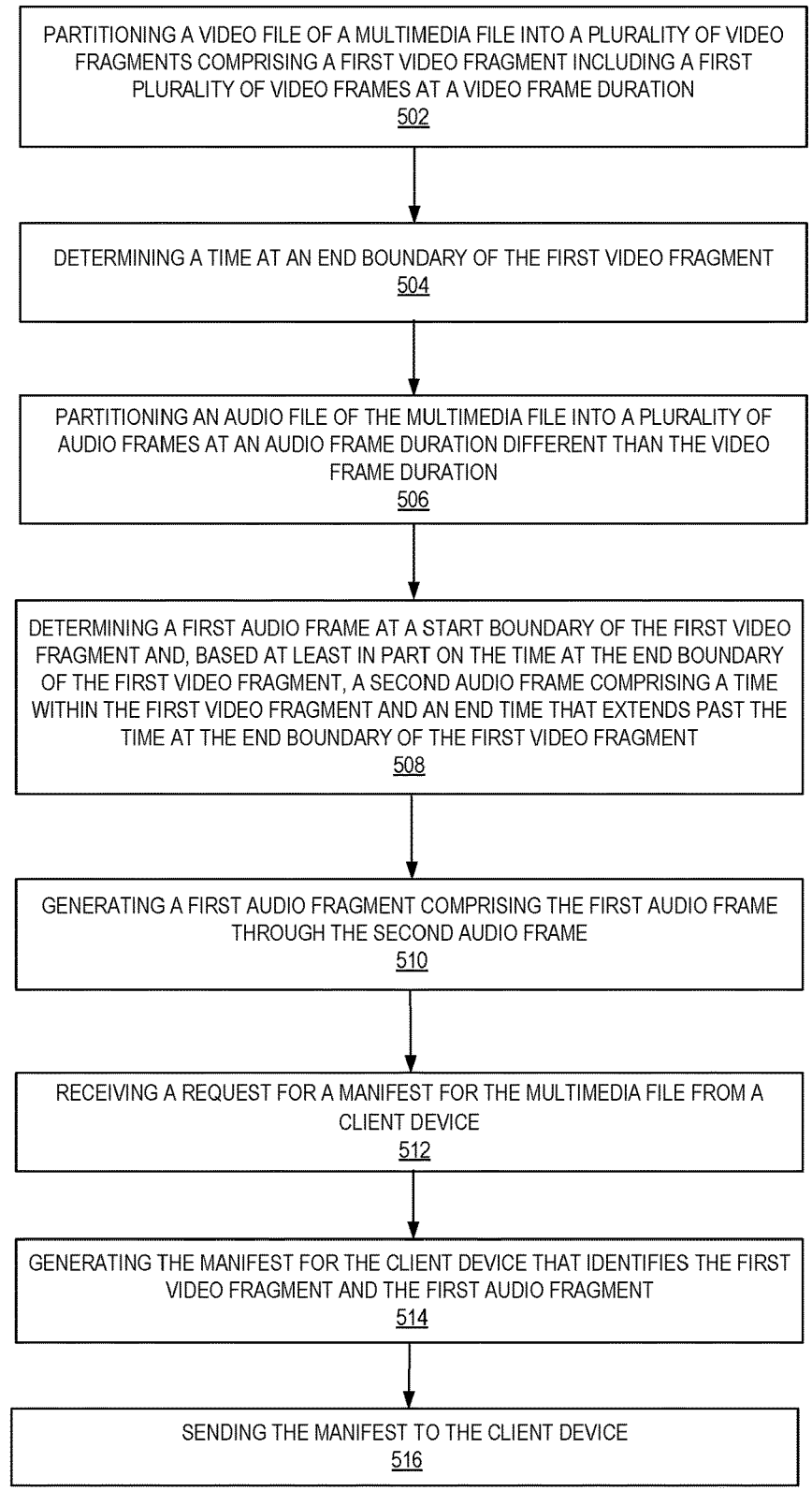
FIG. 5 is a flow diagram illustrating operations of a method for generating a manifest that identifies a first video fragment and a first audio fragment packaged by a video fragment aware audio packaging service based at least in part on a time at an end boundary of the first video fragment according to some embodiments.

FIG. 5 is a flow diagram illustrating operations 500 of a method for generating a manifest that identifies a first video fragment and a first audio fragment packaged by a video fragment aware audio packaging service based at least in part on a time at an end boundary of the first video fragment according to some embodiments. Some or all of the operations 500 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 400 are performed by content delivery system 102 (e.g., implemented in a provider network) of the other figures.

The operations 500 include, at block 502, partitioning a video file of a multimedia file into a plurality of video fragments comprising a first video fragment including a first plurality of video frames at a video frame duration. The operations 500 further include, at block 504, determining a time at an end boundary of the first video fragment. The operations 500 further include, at block 506, partitioning an audio file of the multimedia file into a plurality of audio frames at an audio frame duration different than the video frame duration. The operations 500 further include, at block 508, determining a first audio frame at a start boundary of the first video fragment and, based at least in part on the time at the end boundary of the first video fragment, a second audio frame comprising a time within the first video fragment and an end time that extends past the time at the end boundary of the first video fragment. The operations 500 further include, at block 510, generating a first audio fragment comprising the first audio frame through the second audio frame. The operations 500 further include, at block 512, receiving a request for a manifest for the multimedia file from a client device. The operations 500 further include, at block 514, generating the manifest for the client device that identifies the first video fragment and the first audio fragment. The operations 500 further include, at block 516, sending the manifest to the client device.

In certain embodiments, if the design choice is to have a variable fragment duration, the audio is to be packaged in such a way that A/V synchronization is manageable irrespective of where other (e.g., secondary) content is inserted. The below discusses example operations to optimize the audio and video fragment alignment. In one embodiment, the operations include (1) partitioning video fragments to have a fragment duration of a threshold (e.g., between 2.5 and 5.005) seconds (e.g., based on IDR frames), (2) is to get the accumulated video fragment duration up to the $i^{th}$ video fragment, $VF_i$, (3) assuming the audio presentation time stamp of audio frame is increasing without reordering, then if $VF_i > AS_k$ where $AS_k$ is the time stamp of $k^{th}$ audio frames, add the $k^{th}$ audio frame to the $i^{th}$ audio fragment to be better aligned with the $i^{th}$ video fragment, (4) continue to repeat (3) at next audio frame(s) and stop at the $n^{th}$ audio sample where $VF_i \leq AS_n$ but $VF_i > AS_{n-1}$ and include the $n^{th}$ audio frame in the $i^{th}$ audio fragment (e.g., to allow audio to stream some (e.g., little) duration longer than the video stream at a fragment boundary, and (5) return to (2) for the $(i+1)^{th}$ audio and video fragment, and repeat until the last audio and video fragment. In certain embodiments, (e.g., as (6) for the above operations) if the input content is inserted content (e.g. secondary content, such as, but not limited to, an advertisement), a separate copy of audio fragments and its manifest are generated, e.g., where the last audio frame of the last audio fragment is dropped. This copy of audio fragment and manifest will be used to compensate the accumulated drifting in certain embodiments.

Certain embodiments of (2) above introduces a dependency between audio fragment packaging and video fragment packaging, since audio fragment packaging will need the accumulated video fragment duration, e.g., instead of the two packaging processes being independent of each other. In certain embodiments, operations (2)-(4), and optionally (6), above may introduce a new audio fragment duration (e.g., for an audio encoder) having a duration that is the same or substantially the same as the corresponding video fragment duration (e.g., an audio fragment duration in the range of about 2.5 to about 5.005 seconds), e.g., different from any (e.g., existing) fixed and known audio fragment duration (e.g., an audio fragment of 2.0053 or 1.984 seconds, or any fixed and known audio fragment under a standard).

In certain embodiments, operations (4) ensure the maximum misalignment of one audio frame of duration between audio and video fragment in (e.g., main) content (e.g., 21.33 ms in AAC-LC), and the maximum drifting of one audio frame in inserted content (e.g., secondary content). In certain embodiments, a drifting control threshold may thus be the same (e.g., 34 ms) as that in an integer frame rate. Certain embodiments herein thus allow the removal of the constraints of integer video frame rate and/or a constant fragment duration.

In one embodiment, an API allows (e.g., a user) to set the number of audio frames in each audio fragment, for example, in a system that utilizes variable (e.g., not constant) video fragment durations.

Exemplary environments, systems, etc. that the above may be used in are detailed below.

Figure 6:
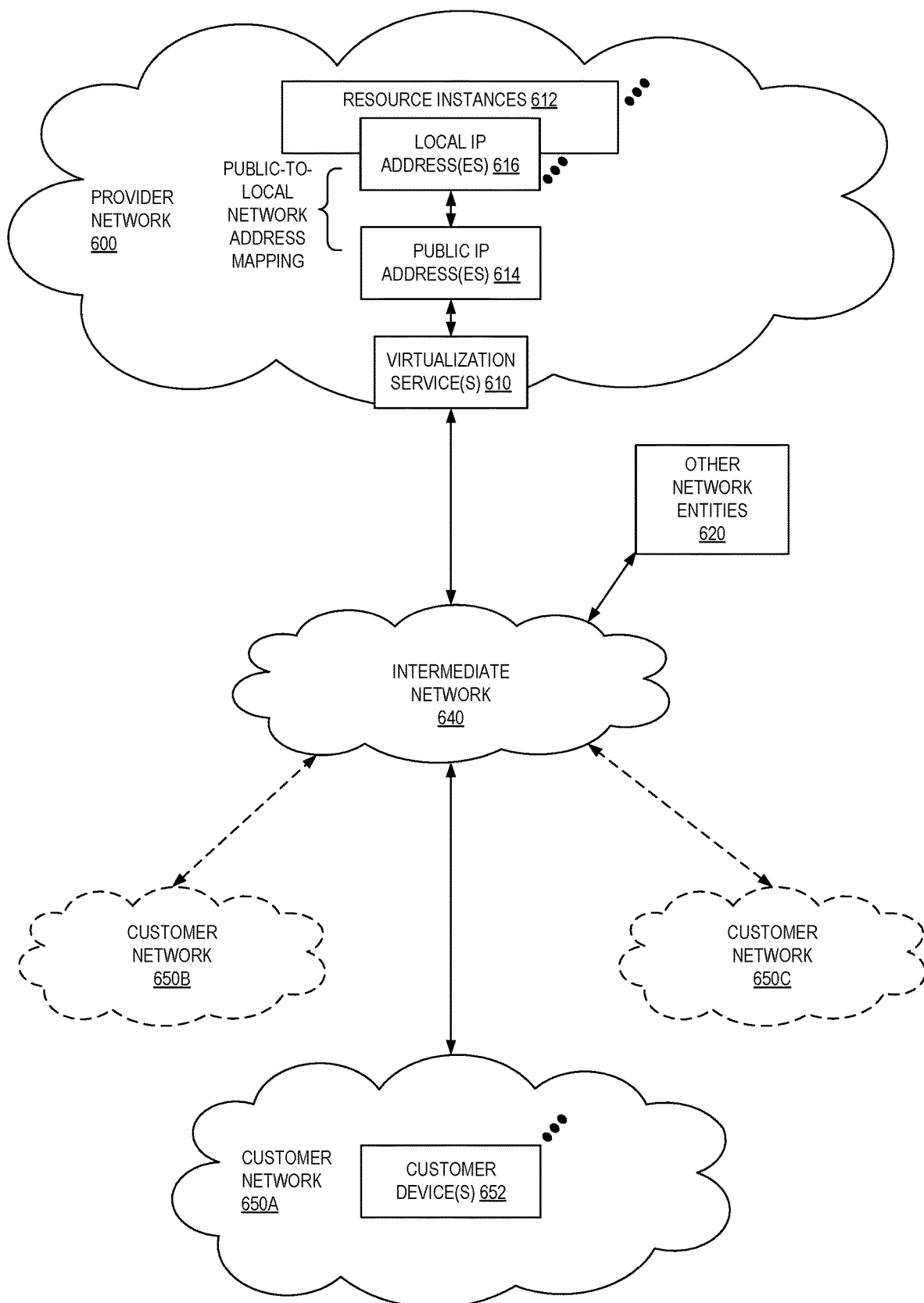
FIG. 6 illustrates an example provider network environment according to some embodiments.

FIG. 6 illustrates an example provider network (or "service provider system") environment according to some embodiments. A provider network 600 may provide resource virtualization to customers via one or more virtualization services 610 that allow customers to purchase, rent, or otherwise obtain instances 612 of virtualized resources, including but not limited to computation and storage resources, implemented on devices within the provider network or networks in one or more data centers. Local Internet Protocol (IP) addresses 616 may be associated with the resource instances 612; the local IP addresses are the internal network addresses of the resource instances 612 on the provider network 600. In some embodiments, the provider network 600 may also provide public IP addresses 614 and/or public IP address ranges (e.g., Internet Protocol version 4 (IPv4) or Internet Protocol version 6 (IPv6) addresses) that customers may obtain from the provider 600.

Conventionally, the provider network 600, via the virtualization services 610, may allow a customer of the service provider (e.g., a customer that operates one or more client networks 650A-650C including one or more customer device(s) 652) to dynamically associate at least some public IP addresses 614 assigned or allocated to the customer with particular resource instances 612 assigned to the customer. The provider network 600 may also allow the customer to remap a public IP address 614, previously mapped to one virtualized computing resource instance 612 allocated to the customer, to another virtualized computing resource instance 612 that is also allocated to the customer. Using the virtualized computing resource instances 612 and public IP addresses 614 provided by the service provider, a customer of the service provider such as the operator of customer network(s) 650A-650C may, for example, implement customer-specific applications and present the customer's applications on an intermediate network 640, such as the Internet. Other network entities 620 on the intermediate network 640 may then generate traffic to a destination public IP address 614 published by the customer network(s) 650A-650C; the traffic is routed to the service provider data center, and at the data center is routed, via a network substrate, to the local IP address 616 of the virtualized computing resource instance 612 currently mapped to the destination public IP address 614. Similarly, response traffic from the virtualized computing resource instance 612 may be routed via the network substrate back onto the intermediate network 640 to the source entity 620.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 600; a customer may then assign their allocated public IP addresses to particular resource instances allocated to the customer. These public IP addresses may be referred to as customer public IP addresses, or simply customer IP addresses. Instead of being assigned by the provider network 600 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 7:
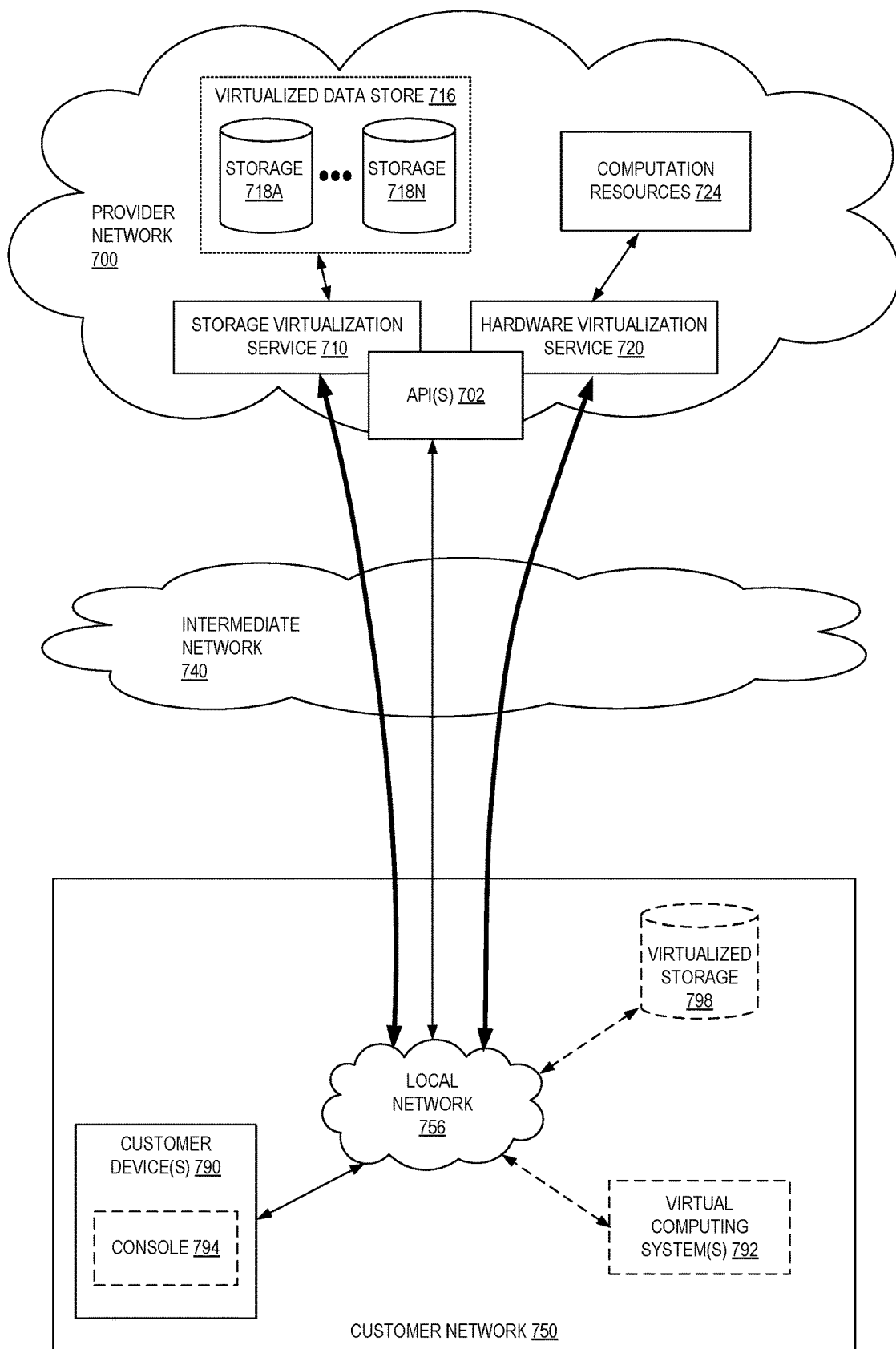
FIG. 7 is a block diagram of an example provider network that provides a storage service and a hardware virtualization service to customers according to some embodiments.

FIG. 7 is a block diagram of an example provider network that provides a storage service and a hardware virtualization service to customers, according to some embodiments. Hardware virtualization service 720 provides multiple computation resources 724 (e.g., VMs) to customers. The computation resources 724 may, for example, be rented or leased to customers of the provider network 700 (e.g., to a customer that implements customer network 750). Each computation resource 724 may be provided with one or more local IP addresses. Provider network 700 may be configured to route packets from the local IP addresses of the computation resources 724 to public Internet destinations, and from public Internet sources to the local IP addresses of computation resources 724.

Provider network 700 may provide a customer network 750, for example coupled to intermediate network 740 via local network 756, the ability to implement virtual computing systems 792 via hardware virtualization service 720 coupled to intermediate network 740 and to provider network 700. In some embodiments, hardware virtualization service 720 may provide one or more APIs 702, for example a web services interface, via which a customer network 750 may access functionality provided by the hardware virtualization service 720, for example via a console 794 (e.g., a web-based application, standalone application, mobile application, etc.). In some embodiments, at the provider network 700, each virtual computing system 792 at customer network 750 may correspond to a computation resource 724 that is leased, rented, or otherwise provided to customer network 750.

From an instance of a virtual computing system 792 and/or another customer device 790 (e.g., via console 794), the customer may access the functionality of storage service 710, for example via one or more APIs 702, to access data from and store data to storage resources 718A-718N of a virtual data store 716 (e.g., a folder or "bucket", a virtualized volume, a database, etc.) provided by the provider network 700. In some embodiments, a virtualized data store gateway (not shown) may be provided at the customer network 750 that may locally cache at least some data, for example frequently-accessed or critical data, and that may communicate with storage service 710 via one or more communications channels to upload new or modified data from a local cache so that the primary store of data (virtualized data store 716) is maintained. In some embodiments, a user, via a virtual computing system 792 and/or on another customer device 790, may mount and access virtual data store 716 volumes via storage service 710 acting as a storage virtualization service, and these volumes may appear to the user as local (virtualized) storage 798.

While not shown in FIG. 7, the virtualization service(s) may also be accessed from resource instances within the provider network 700 via API(s) 702. For example, a customer, appliance service provider, or other entity may access a virtualization service from within a respective virtual network on the provider network 700 via an API 702 to request allocation of one or more resource instances within the virtual network or within another virtual network.

Illustrative System

Figure 8:
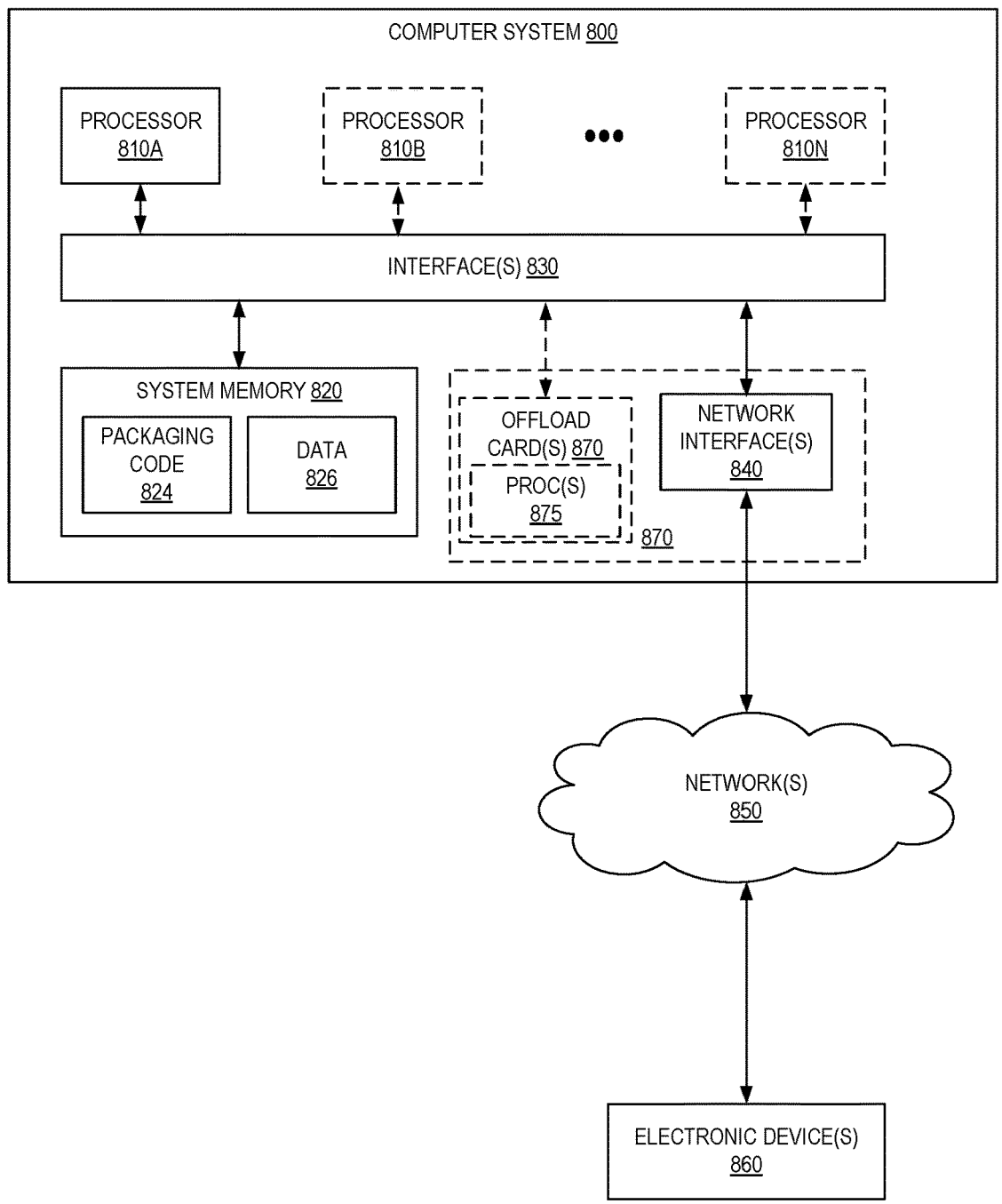
FIG. 8 is a block diagram illustrating an example computer system that may be used in some embodiments.

In some embodiments, a system that implements a portion or all of the techniques for content indexing as described herein may include a general-purpose computer system that includes or is configured to access one or more computer-accessible media, such as computer system 800 illustrated in FIG. 8. In the illustrated embodiment, computer system 800 includes one or more processors 810 coupled to a system memory 820 via an input/output (I/O) interface 830. Computer system 800 further includes a network interface 840 coupled to I/O interface 830. While FIG. 8 shows computer system 800 as a single computing device, in various embodiments a computer system 800 may include one computing device or any number of computing devices configured to work together as a single computer system 800.

In various embodiments, computer system 800 may be a uniprocessor system including one processor 810, or a multiprocessor system including several processors 810 (e.g., two, four, eight, or another suitable number). Processors 810 may be any suitable processors capable of executing instructions. For example, in various embodiments, processors 810 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 810 may commonly, but not necessarily, implement the same ISA.

System memory 820 may store instructions and data accessible by processor(s) 810. In various embodiments, system memory 820 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 820 as packaging code 824 and data 826.

In one embodiment, I/O interface 830 may be configured to coordinate I/O traffic between processor 810, system memory 820, and any peripheral devices in the device, including network interface 840 or other peripheral interfaces. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processor 810.

Network interface 840 may be configured to allow data to be exchanged between computer system 800 and other devices 860 attached to a network or networks 850, such as other computer systems or devices as illustrated in FIG. 1, for example. In various embodiments, network interface 840 may support communication via any suitable wired or wireless general data networks, such as types of Ethernet network, for example. Additionally, network interface 840 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 800 includes one or more offload cards 870 (including one or more processors 875, and possibly including the one or more network interfaces 840) that are connected using an I/O interface 830 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 800 may act as a host electronic device (e.g., operating as part of a hardware virtualization service) that hosts compute instances, and the one or more offload cards 870 execute a virtualization manager that can manage compute instances that execute on the host electronic device. As an example, in some embodiments the offload card(s) 870 can perform compute instance management operations such as pausing and/or un-pausing compute instances, launching and/or terminating compute instances, performing memory transfer/copying operations, etc. These management operations may, in some embodiments, be performed by the offload card(s) 870 in coordination with a hypervisor (e.g., upon a request from a hypervisor) that is executed by the other processors 810A-810N of the computer system 800. However, in some embodiments the virtualization manager implemented by the offload card(s) 870 can accommodate requests from other entities (e.g., from compute instances themselves), and may not coordinate with (or service) any separate hypervisor.

In some embodiments, system memory 820 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 800 via I/O interface 830. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 800 as system memory 820 or another type of memory. Further, a computer-accessible medium may include transmission media or signals such as electrical, electromagnetic, or digital signals, conveyed via a communication medium such as a network and/or a wireless link, such as may be implemented via network interface 840.

Figure 9:
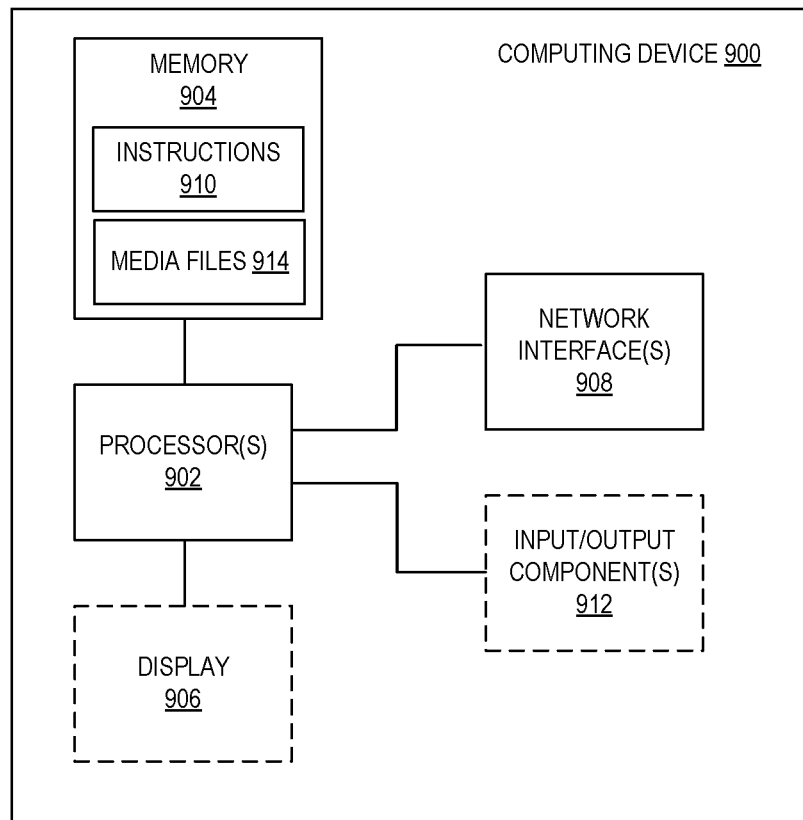
FIG. 9 illustrates a logical arrangement of a set of general components of an exemplary computing device that can be utilized in accordance with various embodiments.

FIG. 9 illustrates a logical arrangement of a set of general components of an example computing device 900. Generally, a computing device 900 can also be referred to as an electronic device. The techniques shown in the figures and described herein can be implemented using code and data stored and executed on one or more electronic devices (e.g., a client end station and/or server end station). Such electronic devices store and communicate (internally and/or with other electronic devices over a network) code and data using computer-readable media, such as non-transitory computer-readable storage media (e.g., magnetic disks, optical disks, Random Access Memory (RAM), Read Only Memory (ROM), flash memory devices, phase-change memory) and transitory computer-readable communication media (e.g., electrical, optical, acoustical or other form of propagated signals, such as carrier waves, infrared signals, digital signals). In addition, such electronic devices include hardware, such as a set of one or more processors 902 (e.g., wherein a processor is a microprocessor, controller, microcontroller, central processing unit, digital signal processor, application specific integrated circuit, field programmable gate array, other electronic circuitry, a combination of one or more of the preceding) coupled to one or more other components, e.g., one or more non-transitory machine-readable storage media (e.g., memory 904) to store code (for example, instructions 910, e.g., which implement an anomaly detector as disclosed herein) and/or media files 914 (e.g., generated by encoding service 110 in FIG. 1), and a set of one or more wired or wireless network interfaces 908 allowing the electronic device to transmit data to and receive data from other computing devices, typically across one or more networks (e.g., Local Area Networks (LANs), the Internet). For example, where computing device 900 is an instance of client device 124 in FIG. 1, e.g., and is coupled via network interface(s) 908 to content delivery system 102 in FIG. 1. The coupling of the set of processors and other components is typically through one or more interconnects within the electronic device, (e.g., busses and possibly bridges). Thus, the non-transitory machine-readable storage media (e.g., memory 904) of a given electronic device typically stores code (e.g., instructions 910) for execution on the set of one or more processors 902 of that electronic device. One or more parts of various embodiments may be implemented using different combinations of software, firmware, and/or hardware.

A computing device 900 can include some type of display element 906, such as a touch screen or liquid crystal display (LCD), although many devices such as portable media players might convey information via other means, such as through audio speakers, and other types of devices such as server end stations may not have a display element 906 at all. As discussed, some computing devices used in some embodiments include at least one input and/or output component(s) 912 able to receive input from a user. This input component can include, for example, a push button, touch pad, touch screen, wheel, joystick, keyboard, mouse, keypad, or any other such device or element whereby a user is able to input a command to the device. In some embodiments, however, such a device might be controlled through a combination of visual and/or audio commands and utilize a microphone, camera, sensor, etc., such that a user can control the device without having to be in physical contact with the device.

Figure 10:
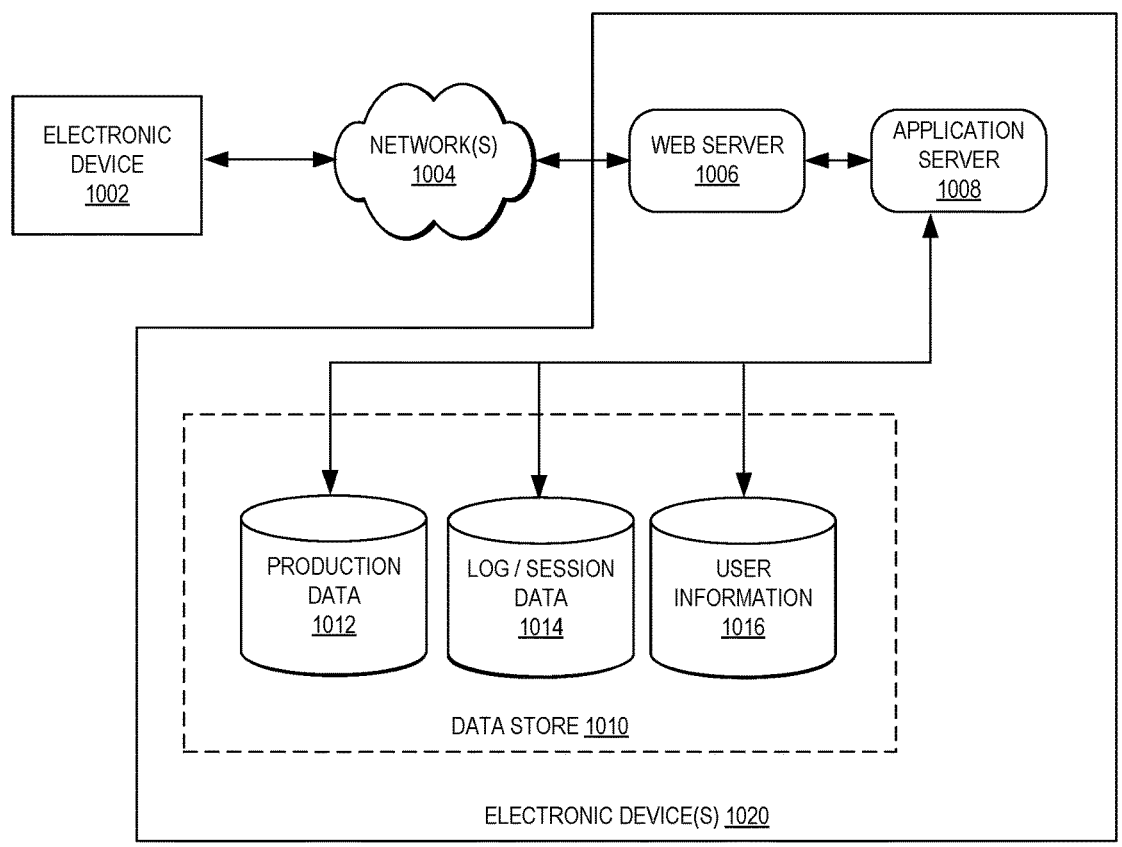
FIG. 10 illustrates an example of an environment for implementing aspects in accordance with various embodiments.

As discussed, different approaches can be implemented in various environments in accordance with the described embodiments. For example, FIG. 10 illustrates an example of an environment 1000 for implementing aspects in accordance with various embodiments. For example, in some embodiments messages are HyperText Transfer Protocol (HTTP) requests that are received by a web server (e.g., web server 1006), and the users, via electronic devices, may interact with the provider network via a web portal provided via the web server 1006 and application server 1008. As will be appreciated, although a web-based environment is used for purposes of explanation, different environments may be used, as appropriate, to implement various embodiments. The system includes an electronic client device 1002, which may also be referred to as a client device and can be any appropriate device operable to send and receive requests, messages or information over an appropriate network 1004 and convey information back to a user of the device 1002. Examples of such client devices include personal computers (PCs), cell phones, handheld messaging devices, laptop computers, set-top boxes, personal data assistants, electronic book readers, wearable electronic devices (e.g., glasses, wristbands, monitors), and the like. The one or more networks 1004 can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network 1004 includes the Internet, as the environment includes a web server 1006 for receiving requests and serving content in response thereto, although for other networks an alternative device serving a similar purpose could be used, as would be apparent to one of ordinary skill in the art.

The illustrative environment includes at least one application server 1008 and a data store 1010. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server 1008 can include any appropriate hardware and software for integrating with the data store 1010 as needed to execute aspects of one or more applications for the client device 1002 and handling a majority of the data access and business logic for an application. The application server 1008 provides access control services in cooperation with the data store 1010 and is able to generate content such as text, graphics, audio, video, etc., to be transferred to the client device 1002, which may be served to the user by the web server in the form of HyperText Markup Language (HTML), Extensible Markup Language (XML), JavaScript Object Notation (JSON), or another appropriate unstructured or structured language in this example. The handling of all requests and responses, as well as the delivery of content between the client device 1002 and the application server 1008, can be handled by the web server 1006. It should be understood that the web server 1006 and application server 1008 are not required and are merely example components, as structured code discussed herein can be executed on any appropriate device or host machine as discussed elsewhere herein.

The data store 1010 can include several separate data tables, databases, or other data storage mechanisms and media for storing data relating to a particular aspect. For example, the data store illustrated includes mechanisms for storing production data 1012 and user information 1016, which can be used to serve content for the production side. The data store 1010 also is shown to include a mechanism for storing log or session data 1014. It should be understood that there can be many other aspects that may need to be stored in the data store, such as page image information and access rights information, which can be stored in any of the above listed mechanisms as appropriate or in additional mechanisms in the data store 1010. The data store 1010 is operable, through logic associated therewith, to receive instructions from the application server 1008 and obtain, update, or otherwise process data in response thereto. In one example, a user might submit a search request for a certain type of item. In this case, the data store 1010 might access the user information 1016 to verify the identity of the user and can access a production data 1012 to obtain information about items of that type. The information can then be returned to the user, such as in a listing of results on a web page that the user is able to view via a browser on the user device 1002. Information for a particular item of interest can be viewed in a dedicated page or window of the browser.

The web server 1006, application server 1008, and/or data store 1010 may be implemented by one or more electronic devices 1020, which can also be referred to as electronic server devices or server end stations, and may or may not be located in different geographic locations. Each of the one or more electronic devices 1020 may include an operating system that provides executable program instructions for the general administration and operation of that device and typically will include computer-readable medium storing instructions that, when executed by a processor of the device, allow the device to perform its intended functions. Suitable implementations for the operating system and general functionality of the devices are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the environment 1000 in FIG. 10 should be taken as being illustrative in nature and not limiting to the scope of the disclosure.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of commercially-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program code, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 718A-718N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
    partitioning a video file of a multimedia file into a plurality of video fragments comprising a first video fragment including a first plurality of video frames at a video frame duration;
    determining a time at an end boundary of the first video fragment;
    partitioning an audio file, corresponding to the video file, of the multimedia file into a plurality of audio frames at an audio frame duration different than the video frame duration;
    determining a first audio frame at a start boundary of the first video fragment and, based at least in part on the time at the end boundary of the first video fragment, a second audio frame comprising an audio time within the first video fragment and an audio end time that extends past the time at the end boundary of the first video fragment;
    generating a first audio fragment comprising the first audio frame through the second audio frame;
    receiving a request for a manifest for the multimedia file from a client device;
    generating the manifest for the client device that identifies the first video fragment and the first audio fragment; and
    sending the manifest to the client device.

2. The computer-implemented method of claim 1, further comprising:
    partitioning the video file of the multimedia file into the plurality of video fragments comprising a second video fragment including a second plurality of video frames at a second video frame duration;
    determining a time at an end boundary of the second video fragment;
    determining a third audio frame at a start boundary of the second video fragment and, based at least in part on the time at the end boundary of the second video fragment, a fourth audio frame comprising an audio time within the second video fragment and an audio end time that extends past the time at the end boundary of the second video fragment; and
    generating a second audio fragment comprising the third audio frame through the fourth audio frame,
    wherein the generating the manifest for the client device comprises generating the manifest that identifies the first video fragment, the second video fragment, the first audio fragment, and the second audio fragment.

3. The computer-implemented method of claim 1, wherein a duration of the first video fragment is a non-integer value and a duration of the first audio fragment is a different, non-integer value.

4. A computer-implemented method comprising:
    partitioning a video file of a multimedia file into a plurality of video fragments comprising a first video fragment including a first plurality of video frames at a video frame duration;
    determining an end boundary of the first video fragment;
    partitioning an audio file, corresponding to the video file, of the multimedia file into a plurality of audio frames at an audio frame duration different than the video frame duration;
    determining a first audio frame corresponding to a start boundary of the first video fragment and, based at least in part on the end boundary of the first video fragment, a second audio frame that includes the end boundary of the first video fragment;
    generating a first audio fragment comprising the first audio frame through the second audio frame;
    receiving a request for a manifest for the multimedia file from a client device;
    generating the manifest for the client device that identifies the first video fragment and the first audio fragment; and
    sending the manifest to the client device.

5. The computer-implemented method of claim 4, further comprising:
    partitioning the video file of the multimedia file into the plurality of video fragments comprising a second video fragment including a second plurality of video frames at a second video frame duration;
    determining an end boundary of the second video fragment;
    determining a third audio frame corresponding to a start boundary of the second video fragment and, based at least in part on the end boundary of the second video fragment, a fourth audio frame that includes the end boundary of the second video fragment; and
    generating a second audio fragment comprising the third audio frame through the fourth audio frame,
    wherein the generating the manifest for the client device comprises generating the manifest that identifies the first video fragment, the second video fragment, the first audio fragment, and the second audio fragment.

6. The computer-implemented method of claim 5, wherein a duration of the first video fragment is the same as a duration of the second video fragment.

7. The computer-implemented method of claim 5, wherein a duration of the first audio fragment is different than a duration of the second audio fragment.

8. The computer-implemented method of claim 5, wherein the first audio fragment and the second audio fragment are not selected from a fixed pattern of audio fragments.

9. The computer-implemented method of claim 4, further comprising selecting the audio frame duration from a plurality of candidate audio frame durations.

10. The computer-implemented method of claim 9, further comprising:
    reading a player type identification value from the client device; and selecting the plurality of candidate audio frame durations based at least in part on the player type identification value.

11. The computer-implemented method of claim 4, wherein a duration of the first video fragment is a non-integer value and a duration of the first audio fragment is a different, non-integer value.

12. The computer-implemented method of claim 4, wherein the end boundary of the first video fragment is not coincident with an end boundary of the first audio fragment.

13. The computer-implemented method of claim 4, further comprising selecting a fragment duration of the plurality of video fragments from a plurality of candidate video fragment durations.

14. The computer-implemented method of claim 13, further comprising:
reading a player type identification value from the client device; and
selecting the plurality of candidate video fragment durations based at least in part on the player type identification value.

15. A system comprising:
a content data store to store a multimedia file; and
a content manager service implemented by a one or more electronic devices, the content manager service including instructions that upon execution cause the one or more electronic devices to perform operations comprising:
partitioning a video file of the multimedia file into a plurality of video fragments comprising a first video fragment including a first plurality of video frames at a video frame duration;
determining an end boundary of the first video fragment;
partitioning an audio file, corresponding to the video file, of the multimedia file into a plurality of audio frames at an audio frame duration different than the video frame duration;
determining a first audio frame corresponding to a start boundary of the first video fragment and, based at least in part on the end boundary of the first video fragment, a second audio frame that includes the end boundary of the first video fragment;
generating a first audio fragment comprising the first audio frame through the second audio frame;
receiving a request for a manifest for the multimedia file from a client device;
generating the manifest for the client device that identifies the first video fragment and the first audio fragment; and
sending the manifest to the client device.

16. The system of claim 15, wherein the content manager service further includes instructions that upon execution cause the one or more electronic devices to perform operations comprising:
partitioning the video file of the multimedia file into the plurality of video fragments comprising a second video fragment including a second plurality of video frames at a second video frame duration;
determining an end boundary of the second video fragment;
determining a third audio frame corresponding to a start boundary of the second video fragment and, based at least in part on the end boundary of the second video fragment, a fourth audio frame that includes the end boundary of the second video fragment; and
generating a second audio fragment comprising the third audio frame through the fourth audio frame,
wherein the generating the manifest for the client device comprises generating the manifest that identifies the first video fragment, the second video fragment, the first audio fragment, and the second audio fragment.

17. The system of claim 16, wherein a duration of the first video fragment is the same as a duration of the second video fragment.

18. The system of claim 16, wherein a duration of the first audio fragment is different than a duration of the second audio fragment.

19. The system of claim 15, wherein a duration of the first video fragment is a non-integer value and a duration of the first audio fragment is a different, non-integer value.

20. The system of claim 15, wherein the end boundary of the first video fragment is not coincident with an end boundary of the first audio fragment.

\* \* \* \* \*